UNITED STATES PATENT OFFICE.

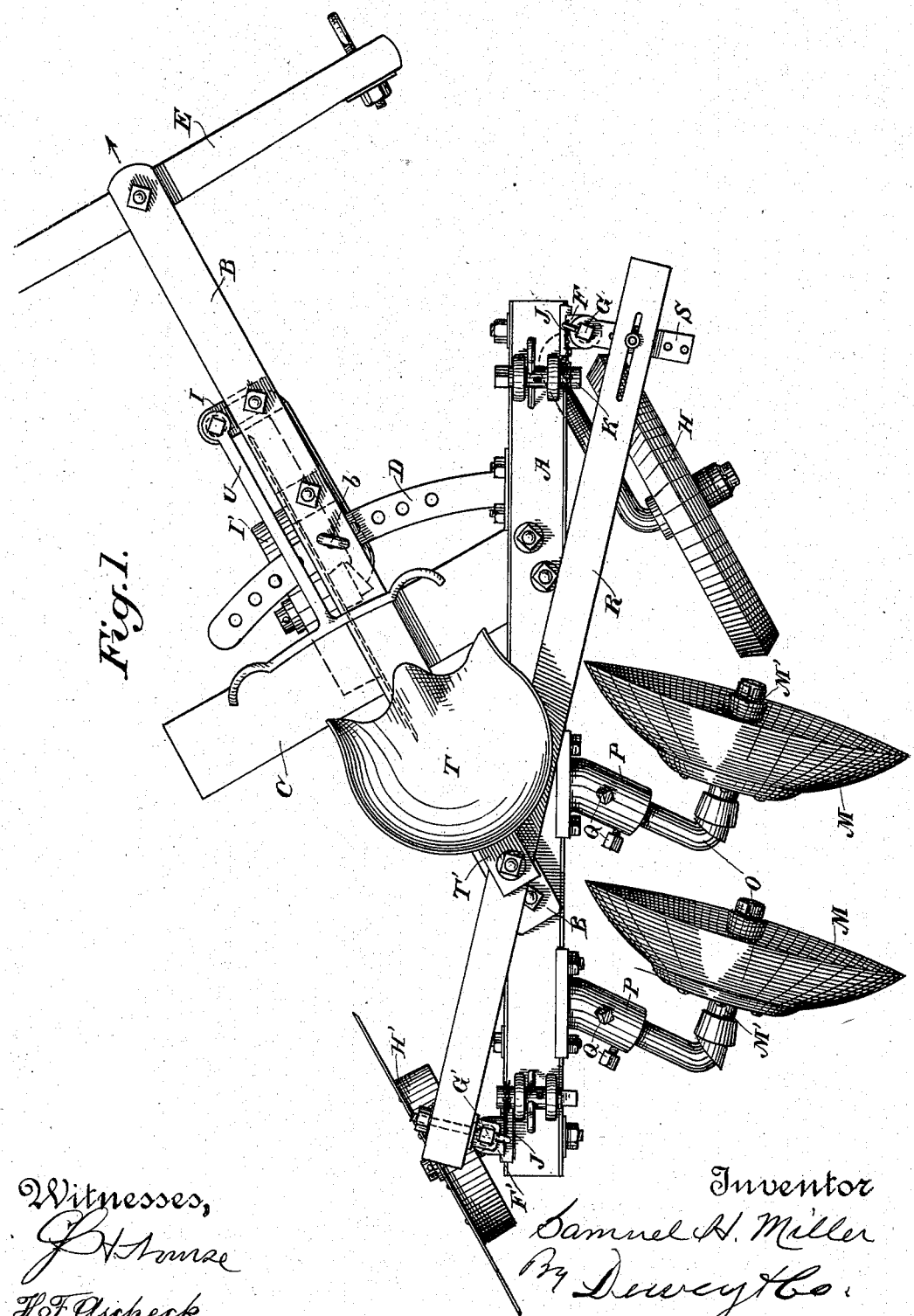

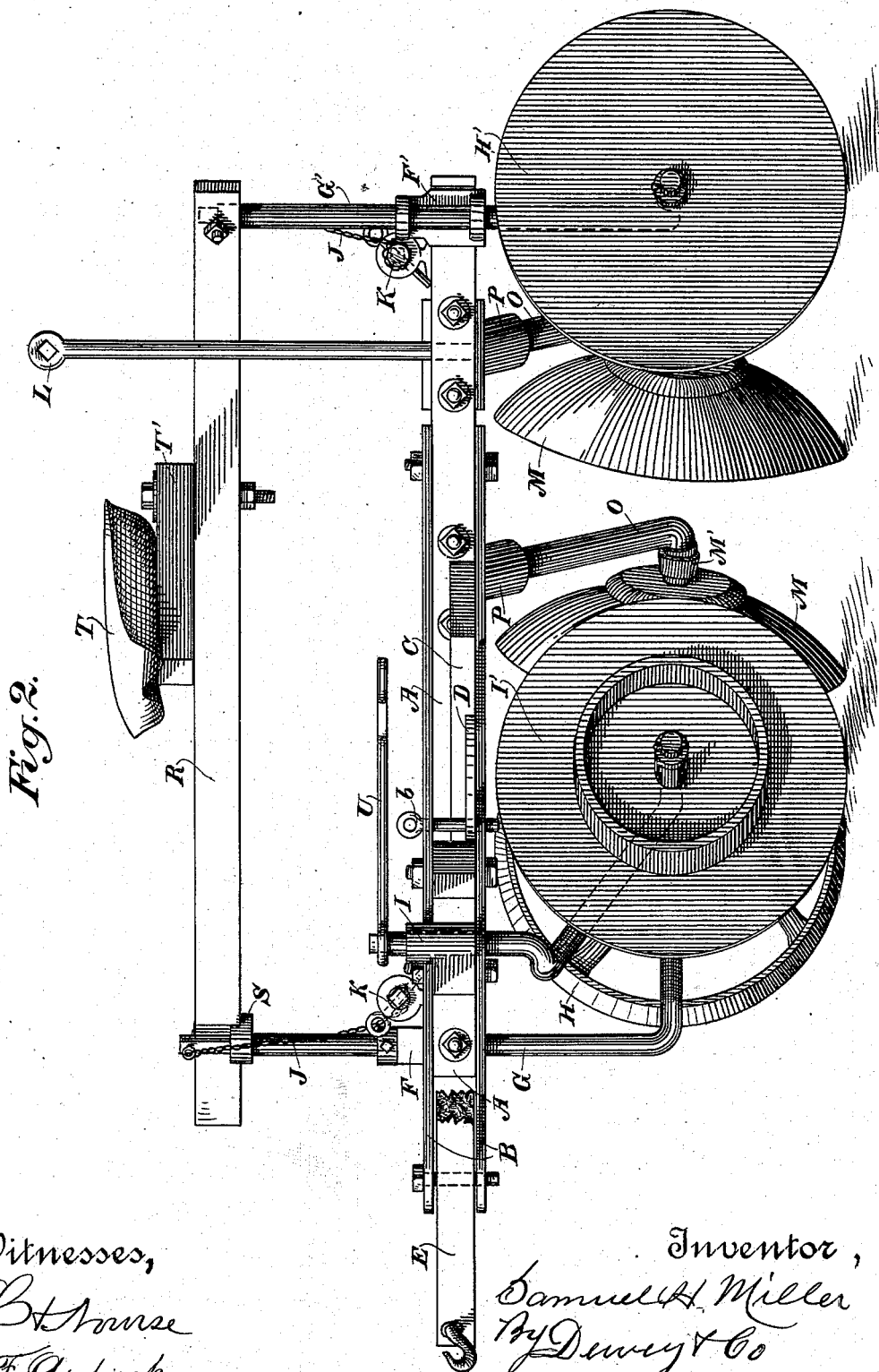

SAMUEL H. MILLER, OF STOCKTON, CALIFORNIA.

DISK GANG-PLOW.

SPECIFICATION forming part of Letters Patent No. 568,094, dated September 22, 1896.

Application filed May 4, 1896. Serial No. 590,148. (No model.)

*To all whom it may concern:*

Be it known that I, SAMUEL H. MILLER, a citizen of the United States, residing at Stockton, county of San Joaquin, State of California, have invented an Improvement in Disk Gang-Plows; and I hereby declare the following to be a full, clear, and exact description of the same.

My invention relates to improvements in gang-plows.

It consists especially in the combination, with a triangular plow-frame, of concavo-convex disks supported therefrom and adjustable with relation to the line of travel, and means for adjusting the bearing and guiding wheels and various parts of the frame with relation to each other, and in details of construction which will be more fully explained by reference to the accompanying drawings, in which—

Figure 1 is a plan view of my plow. Fig. 2 is an elevation of the same at right angles to the plow-beam.

A is a plow-beam which is preferably made of heavy timber with iron plates upon each side to strengthen it and form the proper supports for the various attachments. From a point near the rear end of this timber the draft-beam B extends toward the front and at an angle diverging from the main beam A, to which it is pivoted, as shown.

C is a transverse beam bolted to the beam A and passing between the upper and lower bars, of which the draft-beam B is here shown as formed.

D is a rack or plate having perforations made through it, and a corresponding hole is made through the beam B to receive a pin b, which is adapted to fit into either of the holes in the plate D, so that the draft-bar B may be adjusted to or from the plow-beam A.

To the front end of the plow-beam B is fulcrumed the doubletree E, to which the team is attached, this tree E being constructed for either two or three horses abreast, as may be desired, in the usual style for this part.

The rear and front ends of the beam A have vertical sockets F and F', secured upon opposite sides of the beam and adapted to receive the vertical standards G and G'. The lower ends of these standards are bent, as shown, so as to form axles, upon which the wheels H and H' are journaled, these wheels serving to support the opposite ends of the beam.

At a point near the front of the draft-beam B is fixed a socket I, and in this socket is a vertical standard, which is also bent so as to form the axle of a supporting-wheel I', the three wheels H, H', and I' thus forming a triangular support for the framework.

The wheels H' and I' are provided, as here shown, with thin flanges, which are bolted upon their faces so as to be removable whenever it is desired to drive the plow upon the road, the wheels H' and I' then presenting a flat tread for that purpose.

When the flanges are bolted in place, one projects beyond the bearing-surface, so as to cut into the ground and serve as guides by which the movement of the plow may be directed, and the plows be thrown farther to or from the land in which they are to cut, as will be more fully described hereinafter. In the present case I have shown the flange of I' nearest to the plow-frame and the flange of H' upon the opposite side or away from the frame.

The wheel H is here shown as having a convex face which may be made more or less angular, and if there is no great side draft the wheel H' may be made in the same manner.

The standards G and G' of these wheels are made rectangular at the top, and to the upper ends are connected chains, as shown at J. These chains pass downwardly and are coiled upon windlasses K, which are journaled upon the beam A.

L is a lever having a rectangular socket in one end, which is adapted to fit over the ends of the windlass-shafts, so that the latter may be turned to wind the chains, and thus raise the frame of the plow upon the standards. These windlasses may be held in place by a pawl and ratchet or by a pin passing through holes in the shafts, or by any other suitable means.

The plows consist of disks M, which are concavo-convex and are so mounted as to stand at an angle of approximately forty-five degrees, more or less, with the line of the draft-beam B and the travel of the machine and at the same time at a considerable angle with the ground over which they are moved, so that when forced into the ground they revolve upon their shafts and slice the earth with a drawing cut as they revolve, on account of the angle at which they are placed. These disks or cutters are provided with hubs M', which extend entirely through from the convex into the concave side, and these hubs are fitted upon journal-shafts O, so that by reason of the length of the hubs projecting into the interior of the concavity the hubs themselves are in line beneath the cutting edges of the disks and thus form a more perfect support than if the hubs only extended rearwardly from the convex surfaces. By this construction the wear of the shafts and the hubs is very much lessened because there is no side draft upon them.

The shafts are bent behind the rear of the disks and inclined upwardly, entering the stout socket-pieces P, which are firmly secured to the beam A. These shafts may be moved out or in and also turned in the sockets, so as to vary the inclination of the lower cutting edges of the disks with relation to the ground upon which they are to operate. When properly adjusted, they are secured by set-screws, (shown at Q,) or by other suitable clamp or fastening.

Upon the upper ends of the standards F and F' are supports for a beam R, which extends from one to the other. The rear support of this beam has a rectangular opening made in it, which fits over the rectangular head of the shaft G', which carries the wheel H'.

The front end of the bar rests and is movable upon a horizontal perforated plate S, and by means of a pin passing through the front end of the beam the latter may be adjusted upon this plate S so as to be nearer to or farther from the shaft G, and this turning of the beam R serves to turn the wheel H' to or from the land, as the action of the plows thereon may make necessary.

The seat T is fixed to a beam T', which is bolted upon the timber R so that the seat is projected somewhat forward of this timber and at such a point that the beam C may serve as a foot-rest for the driver.

The head of the vertical shaft of the wheel I' is made rectangular, and to it is fitted the end of a T-shaped steering-bar U. This bar has the cross-arm formed at the end so as to receive the feet of the driver, and by turning this the wheel I' may also be turned so as to guide the machine to any desired point and to hold it up against a tendency to slide downward on hillside-work.

Having thus described my invention, what I claim as new, and desire to secure by Letters Patent, is—

1. A plow consisting of a plow-beam, the concavo-convex disks journaled upon shafts which are fixed to the plow-beam, a draft-beam pivoted to the plow-beam and diverging toward the front therefrom, and means for adjusting it so as to change its angle with relation to the plow-beam, a draft mechanism connected to the front, and bearing-wheels adjustably connected with the front and rear of the plow-beam, and with the front of the adjustable draft-beam.

2. In a gang-plow, a plow-beam having bearing and guide wheels upon opposite sides of its front and rear ends respectively, said wheels having vertical standards adjustably journaled in socket-pieces which are fixed to the beam, windlasses journaled upon the plow-beam, and means for rotating the same and chains connecting the upper ends of the wheel-standards, whereby the frame may be raised or depressed thereon, a draft-beam diverging from the plow-frame and having a third wheel supporting its front end with a vertical standard turnable in a socket-piece upon the front end of said draft-beam.

3. In a gang-plow, a plow-beam having its front and rear ends supported upon wheels upon opposite sides of said front and rear ends respectively, socket-pieces fixed to the beam through which the vertical standards of the wheels are vertically movable, horizontally-journaled windlasses upon the beam with means for turning the same, chains coiling thereon having the upper ends connected with the tops of the wheel-standards, a draft-bar pivoted at the rear to the plow-beam having draft mechanism attached to its front end, and a caster-wheel by which the front end is supported, a rack or perforated plate fixed to the plow-beam extending between the upper and lower parts of the draft-beam, with means for connecting the same thereto so that the angle of the draft with relation to the plow-beam may be altered, concavo-convex disks journaled upon axes which stand diagonally with the line of travel of the machine, and also at an inclination with the surface into which they are to cut, the relative angle of said disks with the line of travel being changeable with the adjustment of the draft-beam.

4. In a gang-plow, a plow-beam having wheels supporting the opposite sides of its opposite ends, with vertical standards passing through guides fixed to the plow-beam and mechanism by which the plow-beam may be raised or depressed upon said standards, a draft-beam having its rear end pivoted to the plow-beam and its front end divergent therefrom, a transverse rack or perforated plate over which the draft-beam is movable, and by which the angle between itself and the plow-beam is regulated, concavo-convex disks having hubs extending through the concavity and beyond the plane of the periphery, shafts upon which said hubs are mounted and turnable, said shafts being bent at an angle, sockets upon the plow-beam into which the ends of said shafts are inserted and in which they are turnable so as to change the angle of inclination of the disks to the surface, and set-screws or means by which the shafts are locked and the angle maintained.

5. In a gang-plow, the plow-beam having the opposite sides of its front and rear ends supported upon wheels which are journaled upon shafts having standards vertically movable with relation to the sockets upon the plow-beams through which they pass, and means for raising and lowering the plow-beam thereon and retaining it at any desired position, a draft-beam having the rear end pivoted to the plow-beam and its front end diverging from the front end of the plow-beam, with means for adjusting the angle of the two, a wheel upon which the front end of the draft-beam is supported, a beam, the rear end of which is fixed to the standard of the rear plow-beam wheel and the front end supported upon a transverse arm from the standard of the front plow-beam wheel, and means for adjusting said bar so as to change the angle of the rear wheel with relation to the line of travel of the machine.

6. In a gang-plow, a plow-beam having concavo-convex disks supported upon axles which are adjustably connected with the beam, said disks having central hubs fitting and rotatable upon the axles, vertically-movable standards at opposite sides of the front and rear respectively of the plow-beam, and mechanism whereby the latter may be raised or depressed upon said standards, wheels journaled upon the bent horizontal lower ends of the standards forming a support for the beam, the rearmost of said wheels having a radially-projecting disk or flange which is adapted to enter the soil, a bar having its rear end fixed to the upper end of the standard of the rearmost wheel, and the front end movable upon a horizontal supporting and holding plate whereby the angle of travel of the rearmost wheel is regulated a draft-beam having its rear end pivoted to the plow-beam, the front end diverging therefrom, a horizontal plate fixed to the front of the plow-beam extending transversely across the draft-beam, means for adjusting and holding the latter to said plate to change the angle with relation to the plow-beam, a flanged wheel journaled upon the lower horizontal end of a vertical standard which is turnable in a socket upon the front end of the draft-beam and a yoke or steering-bar secured to the upper end of said standard within reach of an operator whereby the machine may be steered and its course changed.

In witness whereof I have hereunto set my hand.

SAMUEL H. MILLER.

Witnesses:
S. H. NOURSE,
JESSIE C. BRODIE.